Aug. 8, 1950

C. E. MOSLEY 2,518,361

CURRENT LIMITER

Filed Aug. 12, 1948

Carl E. Mosley,
Inventor.
Haynes and Koenig
Attorneys.

Patented Aug. 8, 1950

2,518,361

UNITED STATES PATENT OFFICE 2,518,361

CURRENT LIMITER

Carl E. Mosley, Overland, Mo., assignor to W. N. Matthews Corporation, St. Louis, Mo., a corporation of Missouri Application August 12, 1948, Serial No. 43,890

2 Claims. (Cl. 171—97)

This invention relates to current limiters, and more particularly to a thermostatic current limiter for use in a power distribution system to limit the amount of current drawn by an individual consumer.

Among the several objects of the invention may be noted the provision of a current limiter for disconnecting a load element energized by a consumer's wiring system without disconnecting the remainder of the load elements to place a limit upon the current drawn by the consumer; the provision of a current limiter of the class described particularly adapted to disconnect an electrical household appliance or appliances, such as a hot water heater for example, whose operation may be discontinued at peak loads without excessive inconvenience to the consumer, without disconnecting other more essential load elements such as the lights; the provision of a current limiter of this class which by reason of limiting the load drawn by the consumer affords a practical means for affording the consumer "off-peak" current rates; and the provision of a current limiter such as described which is economical in construction and reliable in operation. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which one of various possible embodiments of the invention is illustrated, Fig. 1 is a front elevation of the current limiting device of the present invention;

Similar references characters indicate corresponding parts throughout the several views of the drawings.

Figure 1:
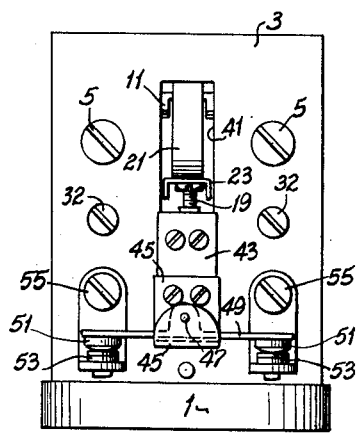

Power companies can afford to sell current at reduced rates to consumers whose local loads do not contribute to costly peak demands. Ordinarily the load contributed by a home or the like contributes to peak demand by portions which might be eliminated without excessive inconvenience to the customer. Other portions such as lighting load and the like normally cannot conveniently be eliminated. A part of the load which may be dispensed with is that caused for example by a hot water heater. If a customer can be induced to reduce the dispensable part of the load when his over-all load is high a power company can afford to give such a customer reduced power rates.

By means of the present invention, a maximum limit is placed upon the customer's total load. If this limit is exceeded, a dispensable part of the load, such as the load due to the operation of an electric water heater or similar appliance, may be automatically disconnected to reduce the load below the limit, without disconnecting more essential portions of the load. This is accomplished by providing a thermostat in series with the customer's load and having the thermostat control a switch supplying the dispensable fraction of the load. It is arranged so that this fraction of the load will be the first to be affected by a demand in excess of the predetermined amount. The circuit section carrying this dispensable fraction part of the load only will be cut off without affecting the load in the remainder of the customer's circuit, and without cutting off the latter. However, if the customer should want this dispensable fraction of the load returned to service, this can be accomplished by the customer reducing the remainder of his load to bring it below the predetermined amount, whereupon he will have reinstated his dispensable load.

Referring now more particularly to the drawings, numeral 1 indicates an insulating base upon which is mounted an insulation panel 3 carrying main line terminals 5. Numeral 7 in general indicates an E-shaped thermostatic member. This member is formed from a sheet of thermostatic material so as to have outer legs 9, a central leg 11 and a connecting part 13. The ends of the legs 9 are anchored to the terminals 5. The high coefficient of expansion element of the thermostat is on top, being numbered 15. The low coefficient of expansion element is on the bottom, being numbered 17. If a circuit is closed across the contacts 5, current will flow through the outer legs 9 and connecting part 13 but will not flow through the leg 11 which, as will appear, functions simply as a mechanical extension.

Figure 2:
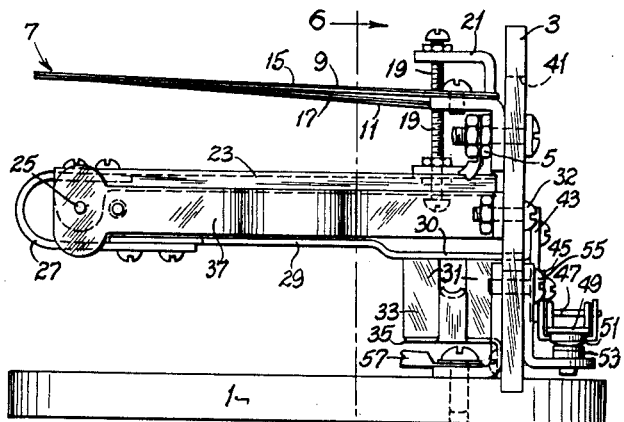
Fig. 2 is a side elevation viewed from the left of Fig. 1.
Figure 3:
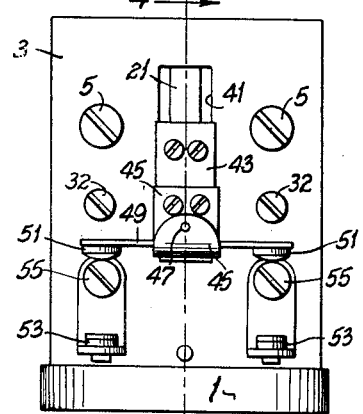
Fig. 3 is a view similar to Fig. 1 but showing an alternate position of parts.
Figure 4:
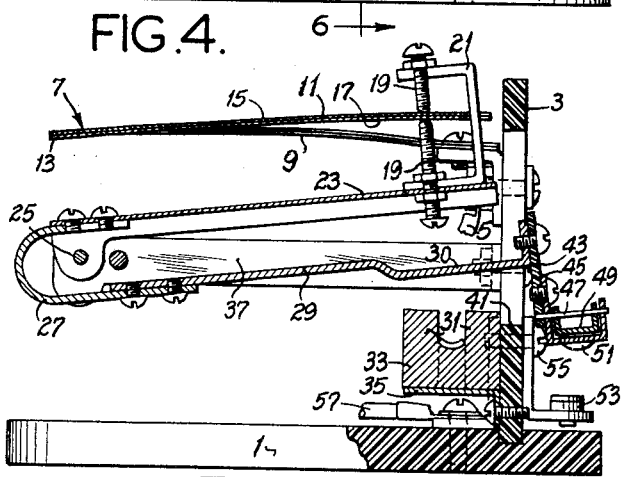
Fig. 4 is a longitudinal section taken on line 4—4 of Fig. 3.
Figure 6:
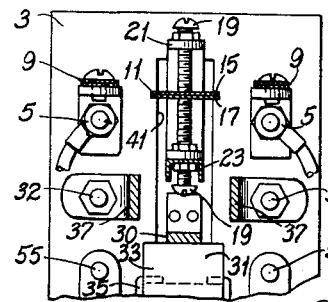
Fig. 6 is a vertical section taken on line 6—6 of Fig. 2.
Figure 5:
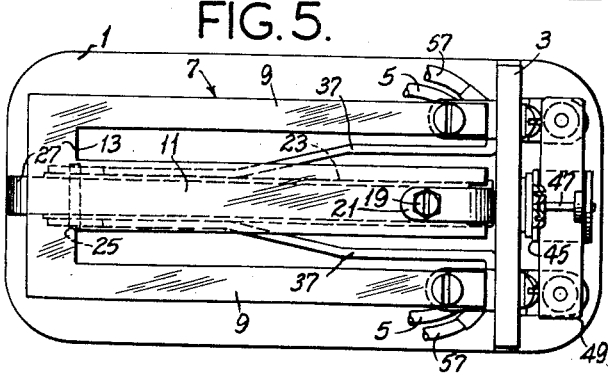
Fig. 5 is a top plan view of Fig. 2.

In its cold condition the thermostatic element is as shown Figs. 1 and 2. In its hot overload condition it will assume a position such as shown in Figs. 3 and 4. Its hot condition is brought about by excessive current flow. In the cold condition the leg 11 is down; in the hot condition this leg is up.

The outer end of the leg 11 is engaged on opposite sides by adjusting set screws 19. These are threaded through a fork 21, the latter being attached to a rigid arm 23 pivoted at 25. Attached to the arm 23 is a spring loop 27 to which in turn is fastened a rigid arm 29 composed of magnetic material. The outer end of arm 29 forms an armature 30 adapted to be attracted to the poles 31 of a U-shaped permanent magnet 33. This magnet is supported by means of a bracket 35 upon the insulating panel 3. The pivot 25 is in a U-shaped bracket 37 which is secured to the panel 3 as by bolts 32.

The armature 30 extends through a slot 41 in the panel 3. Here it is provided with an insulating plate 43 which supports a clip 45. A pivot 47 on the clip supports a switch arm 49 having contacts 51 engageable with auxiliary line contracts 53. The contacts 53 are mounted upon the panel 3. The mounting bolts 55 therefor reach through the panel and form an attachment for auxiliary line terminals 57. These line terminals 57 are exclusively in the part of the circuit serving the dispensable current consuming appliance.

Figure 7:
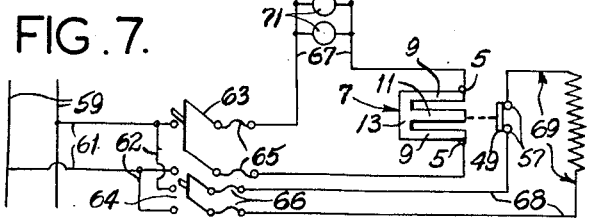
Fig. 7 is a wiring diagram.

In Fig. 7 is shown how the device is connected in the house wiring circuit. At 59 is shown the exterior power line which, through a general service branch circuit 61 including a line switch 63 and fuses 65, feeds the house line or wiring system 67. In series with this line 67 is located the E-shaped thermostatic element 7. Thus, the house-line current may flow through legs 9 and connection 13 to the house line 67 and the general load represented by lights 71. The dispensable hot water heater part of the house circuit is shown at 69. This is connected across the service circuit 61 through an appliance branch circuit 62, line switch 64, fuses 66 and wires 68. Thus, only the current for several load elements 71 passes through the thermostat 7. The line terminals 5 are connected in series with the house line 67. The auxiliary terminals appear at 57, being connected in the branch circuit 62, 64, 66 and 68 with the dispensable load element 69. The switch arm 49 is also indicated as being mechanically coupled to the thermostatic member 7.

At any current value below a predetermined maximum load, the thermostatic element 7 does not move from its Fig. 2 position far enough to open the contacts 57. However, when this load is exceeded, the current value is sufficient that this element 7 moves from the Fig. 2 to the Fig. 4 position. This causes the arm 11 to lift. This raises the upper arm 23 of the U-shaped assembly 23, 27 and 29. Since the armature 30 is held against the poles 31 of the magnet 33, tension is placed in the spring 27. This results in a delayed withdrawal of the armature from the poles 31 until a tension is reached in the spring 27 which causes the armature to break away from the poles 31 with a snap action. This also draws up the switch arm 49 with a snap action, thus suddenly breaking the connection between the terminals 57. This disconnects the dispensable hot water heater part of the appliance branch circuit 62 but does not interfere with the supply of current to the remainder of the load elements 71.

At any time that the current drawn by load elements 71 drops sufficiently to bring the current value to below said predetermined amount, the thermostatic element 7 cools and takes the position shown in Fig. 2, thus reclosing the heater load circuit 69. Thus, if due to excessive load at 71 a customer's water heater 69 has been cut off, he may reinstate operation of the water heater by reducing the load at 71. The customer has an option in this respect, but if he does nothing he is only without the most dispensable of the various current consuming devices in the house circuit.

The amount of current which the device of the present invention will carry without opening line terminals 57 may be conveniently adjusted by adjustment of upper and lower set screws 19. For example, if it is desired to cause the contacts 57 to be opened at a lower total load value set screws 19 are both moved downward until the contacts 57 are opened at this new lower predetermined value.

The form of the E-shaped thermostatic element 7 is particularly suitable for this device because it provides not only the thermostatic legs 9 for the series connection through the connecting part 13, but also the operative part 11 functions as a lever acting through a mechanical linkage for greatly multiplying the motion which may be obtained from the thermostat and for compensating ambient temperature variations. This motion, taken in connection with the quick-release magnetic means for the switch 49 assures a large throw for the switch and a quick break, thus inhibiting arcing and decreasing contact deterioration.

Cross reference is made to applicant's divisional application entitled Current Limiter, Serial No. 129,775, filed November 28, 1949.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:

1. In a power distribution system, a consumer's general service supplying power to the consumer's wiring system including general load elements such as lights, a branch circuit connected to the general service supplying a consumer's dispensable appliance such as an electric water heater, and a current limiter adapted to limit the consumer's peak power consumption, said current limiter comprising a current responsive thermostatic element and a single normally closed switch mechanically coupled to said thermostatic element, said switch being connected in the branch circuit supplying the dispensable appliance and said thermostatic element being connected solely in the circuit supplying the consumer's general load elements so as to be responsive only to the current drawn by said general load elements.

2. In a power distribution system, a consumer's general service supplying power to the consumer's wiring system including general load elements such as lights, a branch circuit connected to the general service supplying a consumer's dispensable appliance such as an electric water heater, and a current limiter adapted to limit the consumer's peak power consumption, said current limiter consisting of a current responsive bimetallic thermostatic plate and a single normally closed switch mechanically coupled to said thermostatic plate, said switch being connected solely in the branch circuit supplying the dispensable appliance and said bimetallic thermostatic plate being connected solely in the circuit supplying the consumer's general load elements so as to be responsive to the current drawn by said general load elements.

CARL E. MOSLEY.

REFERENCES CITED

The following references are of record in the file of this patent:

UNITED STATES PATENTS

| Number | Name | Date |
|---|---|---|
| 1,158,037 | Evans | Oct. 26, 1915 |
| 1,749,718 | Randolph | Mar. 4, 1930 |
| 2,374,022 | Lee | Apr. 17, 1945 |
| 2,425,717 | Bean | Aug. 19, 1947 |